United States Patent
Hamakawa et al.

(10) Patent No.: US 6,726,398 B2
(45) Date of Patent: Apr. 27, 2004

(54) ROAD SIGN DEVICE AND SPONTANEOUSLY EMITTED LIGHT SIGN SYSTEM USED FOR THE DEVICE

(75) Inventors: Yasuhiko Hamakawa, Shiga (JP); Yasuo Kaneko, Mie (JP); Katsuhito Inagaki, Mie (JP)

(73) Assignee: Sekisui Jushi Kabushiki Kaisha, Osaka (JP)

( * ) Notice: Subject to any disclaimer, the term of this patent is extended or adjusted under 35 U.S.C. 154(b) by 34 days.

(21) Appl. No.: 09/959,552

(22) PCT Filed: Feb. 16, 2001

(86) PCT No.: PCT/JP01/01145
§ 371 (c)(1),
(2), (4) Date: Oct. 30, 2001

(87) PCT Pub. No.: WO01/61112
PCT Pub. Date: Aug. 23, 2001

(65) Prior Publication Data
US 2002/0159834 A1 Oct. 31, 2002

(30) Foreign Application Priority Data
Feb. 17, 2000 (JP) ......................... 2000-038995

(51) Int. Cl.$^7$ .................. E01F 9/053; G02B 5/134
(52) U.S. Cl. ................. 404/13; 404/12; 359/531; 359/545
(58) Field of Search ............. 404/13, 14, 15, 404/16, 12; 362/153.1; 359/531, 532, 545

(56) References Cited

U.S. PATENT DOCUMENTS

| | | | | |
|---|---|---|---|---|
| 4,701,693 A | * | 10/1987 | Nishimura | 323/303 |
| 4,955,982 A | * | 9/1990 | Paulos | 404/11 |
| 5,280,220 A | * | 1/1994 | Carter | 315/152 |
| 5,556,189 A | * | 9/1996 | Wallis | 362/153.1 |
| 5,669,691 A | * | 9/1997 | Barrow | 362/153.1 |
| 5,703,719 A | * | 12/1997 | Chen | 359/547 |
| 5,782,552 A | * | 7/1998 | Green et al. | 362/183 |
| 5,785,409 A | * | 7/1998 | Reinert, Sr. | 362/153.1 |
| 5,984,570 A | * | 11/1999 | Parashar | 404/14 |
| 6,033,083 A | * | 3/2000 | Reinert, Sr. | 362/153.1 |
| 6,106,134 A | * | 8/2000 | Bomas | 362/153.1 |
| 6,113,245 A | * | 9/2000 | Reinert, Sr. | 362/153.1 |
| 6,459,218 B2 | * | 10/2002 | Boys et al. | 315/324 |

FOREIGN PATENT DOCUMENTS

| | | | |
|---|---|---|---|
| DE | 19809478 A1 | * 9/1999 | F21Q/3/00 |
| JP | 60-3130 | 1/1985 | |
| JP | 8189016 | 7/1996 | |
| JP | 8-189016 | 7/1996 | |
| JP | 10240175 | 9/1998 | |
| JP | 10-240175 | 9/1998 | |
| JP | 3055207 | 10/1998 | |
| NZ | PCT/NZ9500061 | * 7/1995 | |

* cited by examiner

*Primary Examiner*—Thomas B. Will
*Assistant Examiner*—Raymond W Addie
(74) *Attorney, Agent, or Firm*—Rader, Fishman & Grauer PLLC

(57) ABSTRACT

A road marking device comprises: a tubular, bottomed casing which has an open top end; a cover mounted over an opening in the casing and having a window; a self-luminous marking system composed of a condenser housed in the casing, an illuminant which emits light by receiving a power supplied from the condenser, and a circuit for driving the illuminant; and a transparent element which transmits and outwardly radiates the light emitted from the illuminant. The transparent element is fixed between the cover and the casing which cooperatively hold a periphery of the transparent element, with a part of the transparent element protruding outwardly from the window in the cover. In a self-luminous marking system, an LED is utilized without application of voltage so as to detect the quantity of light in the road environment and to generate an electromotive force in response to an incident light. Based on the electromotive force generated by this LED, the drive of a display LED is controlled.

15 Claims, 9 Drawing Sheets

Fig.10

| Stages \ Circuits | | Timer | Light quantity discrimination circuit | LED drive cuicuit | LED |
|---|---|---|---|---|---|
| Storage | | ON | OFF | OFF | OFF |
| ↓ Shipmennt | | | | | |
| During construction | | ON | ON ← | | |
| | | disconnected ← | ┘ | OFF | OFF |
| After construction | DAY | | ON | OFF | OFF |
| | ↕ | | | | |
| | NIGHT | | ON | ON | ON |

\* —when a predeterminded light is incident

ROAD SIGN DEVICE AND SPONTANEOUSLY EMITTED LIGHT SIGN SYSTEM USED FOR THE DEVICE

TECHNICAL FIELD

The present invention relates to a road marking device which is installed as a center line, an edge line, a stop line and a crosswalk line, for the purpose of calling attention of drivers and pedestrians and guiding their line of vision. The present invention also relates to a self-luminous marking system for giving such marking.

BACKGROUND ART

An example of road marking devices includes an embeddable self-luminous road stud. This type of road stud comprises a transparent element made of a synthetic resin lens (e.g. polycarbonate), and a luminous unit which is disposed below the transparent element and composed of an illuminant and a condenser. The illuminant emits light when it receives a power supplied by the condenser, and the emitted light is transmitted and outwardly radiated through the transparent element. Where such road studs define the center line of a road, the center line is illuminated to help the driver who travels at night or in a tunnel.

As prior art, Japanese Patent Application Laid-open No. H8-189016 (JP-A-189016/1996) describes a method of equipping a road stud base with a transparent element made of a synthetic resin lens. Specifically, bolt holes are formed along the edge of the transparent element, while corresponding bolt holes are provided in the metal road stud base to be buried underground. The transparent element is directly fixed on the road stud base by screwing a bolt through each bolt hole.

In the road marking devices such as self-luminous road studs and self-luminous signs, an illuminant is designed to emit light by a conventional self-luminous marking system shown by the block diagram in FIG. 12.

When utilized in the road marking device, this system detects the illuminance in the road environment and properly controls the illuminant so as to emit light at a required brightness. Traditionally, the illuminance is detected with the use of a solar battery output or a general illuminance sensor available on the market.

In this system, a battery 125 or a solar battery 126 is commonly used as the power source. The solar battery 126 is accompanied by a secondary battery 127 for charging an electromotive force generated in the daytime. On the contrary, the output of the solar battery 126 drops during the night, when no light is incident on the solar battery 126 and no electromotive force is produced. Based on the output of the solar battery 126, a day/night discrimination circuit 123 decides that the illuminance in the road environment corresponds to that of "NIGHT". Then, an LED drive circuit 122 is activated to supply a power from the secondary battery 127 to an LED 120, via a power supply circuit 124. The LED 120 emits light as a consequence.

In contrast, when the battery 125 is used alone in lieu of the solar battery 126, an illuminance sensor 121 is additionally disposed. The illuminance sensor 121 detects the illuminance in the road environment, and the day/night discrimination circuit 123 decides the road environment based on the detected output. When judged as "NIGHT", the LED drive circuit 122 is activated to supply a power from the battery 125 to the LED 120 via the power supply circuit 124, thereby allowing the LED 120 to emit light.

With regard to the former of the above-mentioned prior art technologies, there are some problems concerning the manner of mounting the transparent element made of a synthetic resin lens on the road stud base.

In detail, the transparent element is weaker under stress than metals. Accordingly, where the transparent element is directly bolted on the road stud base, the synthetic resin lens may be subjected, along the bolt holes, to an excessive stress caused by the impact of travelling vehicles or the like. Under such stress, the transparent element may be cracked and broken. Besides, cracking may happen also due to the thermal hysteresis resulting from the difference of summer and winter temperatures.

As for the self-luminous marking system described in the latter of the prior art technologies, the system has to include an exclusive illuminance sensor unit, or an additional member or element in either respect. It is therefore difficult to minimize the size of the device or to reduce the cost through rationalization. Particularly, use of a general illuminance sensor involves problems concerning its installation position, increase in the design processes and the number of parts, and inevitable rise of costs.

In order to solve these problems, the present invention intends to provide a road marking device which has a waterproof mechanism and which prevents damage of the transparent element in the best possible way. The present invention further intends to provide a self-luminous marking system which can realize miniaturization of the device and cost reduction.

DISCLOSURE OF THE INVENTION

In order to solve the above problems, a road marking device of the present invention comprises: a tubular, bottomed casing which has an open top end; a cover mounted over an opening in the casing and having a window; a self-luminous marking system composed of a condenser housed in the casing, an illuminant which emits light by receiving a power supplied from the condenser, and a circuit for driving the illuminant; and a transparent element which transmits and outwardly radiates the light emitted from the illuminant. The transparent element is fixed between the cover and the casing which cooperatively hold a periphery of the transparent element, and a part of the transparent element protrudes outwardly from the window in the cover.

In this arrangement, the transparent element is securely mounted between the cover and the casing which cooperatively hold the periphery of the transparent element, without using a screw or bolt which penetrates through the transparent element. In this structure, the transparent element is free from local stresses such as impacts or deflection. The resulting road marking device is prevented from cracking and exhibits a remarkable durability.

Besides, since the cover envelops most of the transparent element, this structure imparts a protective function for the transparent element which has an insufficient mechanical strength.

In the above arrangement, the casing may be provided with an edge which outwardly and horizontally projects from a top end periphery of the casing, and a vertical wall which vertically extends from a certain portion of the edge as formed along a whole circumference thereof. Further, the cover may have a bent wall which can be closely attached to an external circumference of the vertical wall. While the external circumference of the vertical wall is closely attached to the bent wall, the casing is capped with the cover, and the transparent element is fixed in a clamped manner by the edge, an internal circumference of the vertical wall and the cover which cooperatively hold a periphery of the transparent element.

Further in the above arrangement, a packing material may be inserted between an external circumferential wall of the transparent element and the vertical wall, such that the transparent element presses on the vertical wall with interposition of the packing material. Alternatively, such packing material may be inserted in a recess formed in the external circumferential wall of the transparent element, such that the transparent element presses on the vertical wall with interposition of the packing material.

This structure hermetically seals the casing by shutting off the communication between the inside and the outside of the casing, which results in satisfactory waterproof property. This arrangement assures stronger engagement between the transparent element and the casing, while maintaining the waterproof function. Consequently, it is possible to accomplish an excellent combination of the illumination function and the waterproof function.

To fix the cover on the casing, any of the following structures can be optionally utilized. First, a screw groove is formed in each of an external circumferential surface of the vertical wall and an internal circumferential surface of the bent wall, wherein these screw grooves are engaged with each other. Second, a recess is formed in at least either of an external circumferential surface of the vertical wall or an internal circumferential surface of the bent wall, wherein a packing material is inserted in the recess. Third, a ridge is formed on each of an external circumferential surface of the vertical wall and an internal circumferential surface of the bent wall, in a mutually engageable relation, wherein the ridges are engaged with each other. Fourth, each of the vertical wall and the bent wall has a bolt hole, with the bolt holes communicating with one another when an external circumferential surface of the vertical wall is closely attached to an internal circumferential surface of the bent wall, wherein a bolt is screwed into these bolt holes. Fifth, each of the edge and the bent wall has a bolt hole, with the bolt holes communicating with one another when a top surface of the edge is closely attached to a bottom end surface of the bent wall, wherein a bolt is screwed into these bolt holes. And sixth, the cover is equipped with a flange which projects outwardly and horizontally from a bottom end of the bent wall, and a spring steel is provided for tightly clamping the flange and the edge.

Where the cover is fixed on the casing according to any of the above structures, the transparent element, which is accommodated therein and free from a stress load, can maintain its mechanical strength in a simple manner.

A self-luminous marking system of the present invention comprises: a first LED which emits light when a quantity of light in a road environment is less than a predetermined level; a battery for supplying a power to the first LED; a drive circuit for controlling a drive of the first LED; a second LED utilized without application of voltage so as to generate an electromotive force in response to an incident light; a light quantity discrimination circuit which determines, based on the electromotive force generated by the second LED, whether the quantity of light in the road environment is less than the predetermined level; and a switch circuit which controls an operation of the drive circuit, based on a result determined by the light quantity discrimination circuit.

Preferably, the light quantity discrimination circuit starts to operate, when the second LED continuously generates an electromotive force for a given time in response to the incident light.

In the above self-luminous marking system, the battery may be replaced with a solar battery and a condenser element.

Given that an LED is a crystal having an p-n junction, the second LED is used without application of a voltage. As a consequence, when a light is incident on the second LED, a free electric charge is generated and transformed into an electric energy, thereby producing an electromotive force. Judging from the electromotive force, if the quantity of light in the road environment is lower than the predetermined level, the first LED is activated. A series of these operations proceeds automatically.

Further, it is desirable to utilize the self-luminous marking system of the present invention, in connection with the road marking device of the present invention as mentioned earlier.

BRIEF DESCRIPTION OF DRAWINGS

FIG. 10 explains the operations in the embodiment of the self-luminous marking system of the present invention.

BEST MODE FOR CARRYING OUT THE INVENTION

The embodiments of the present invention are hereinafter described with reference to the drawings.

Embeddable Self-luminous Road Stud

Figure 1:
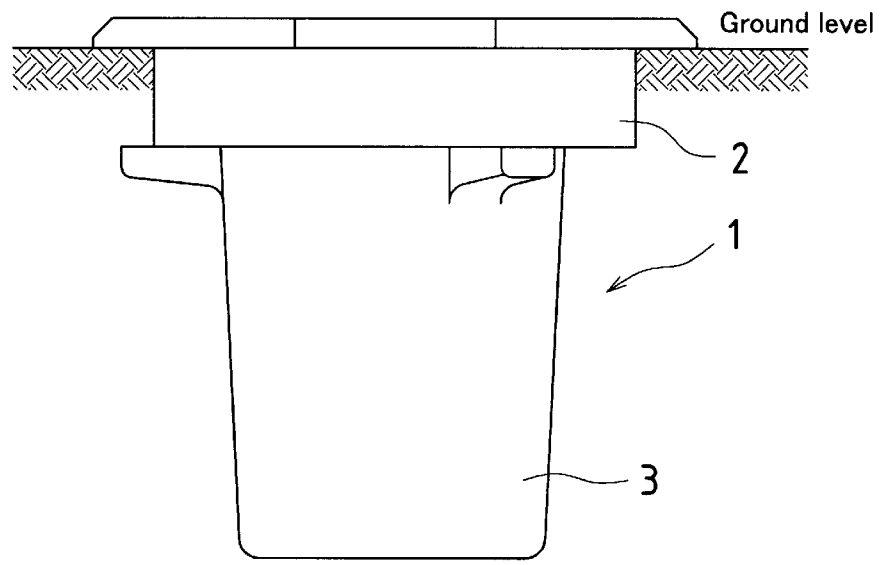
FIG. 1 is a front view showing the first embodiment of an embeddable self-luminous road stud according to the road marking device of the present invention.
Figure 2:
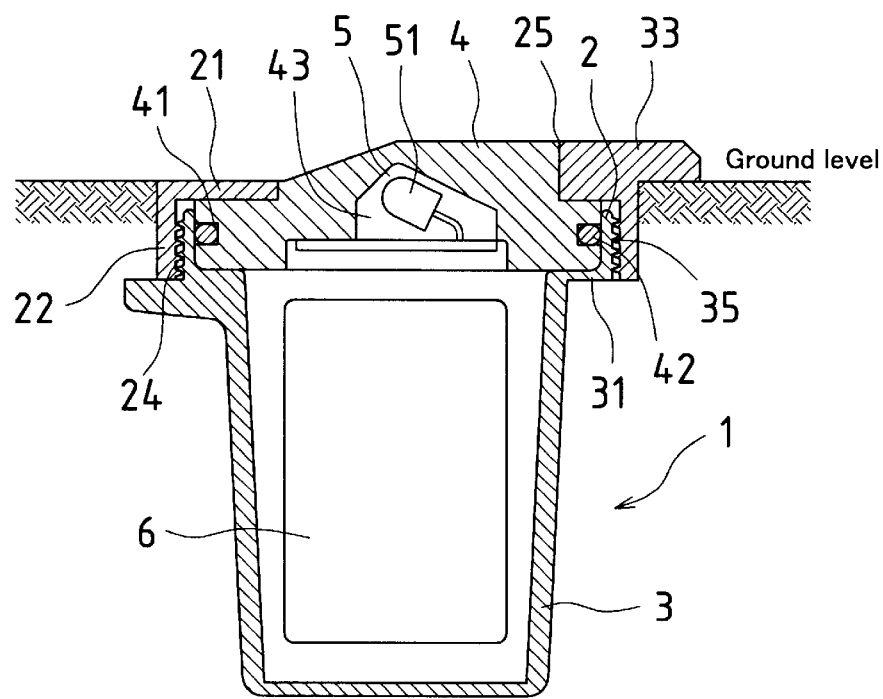
FIG. 2 is a sectional view of the first embodiment.
Figure 3:
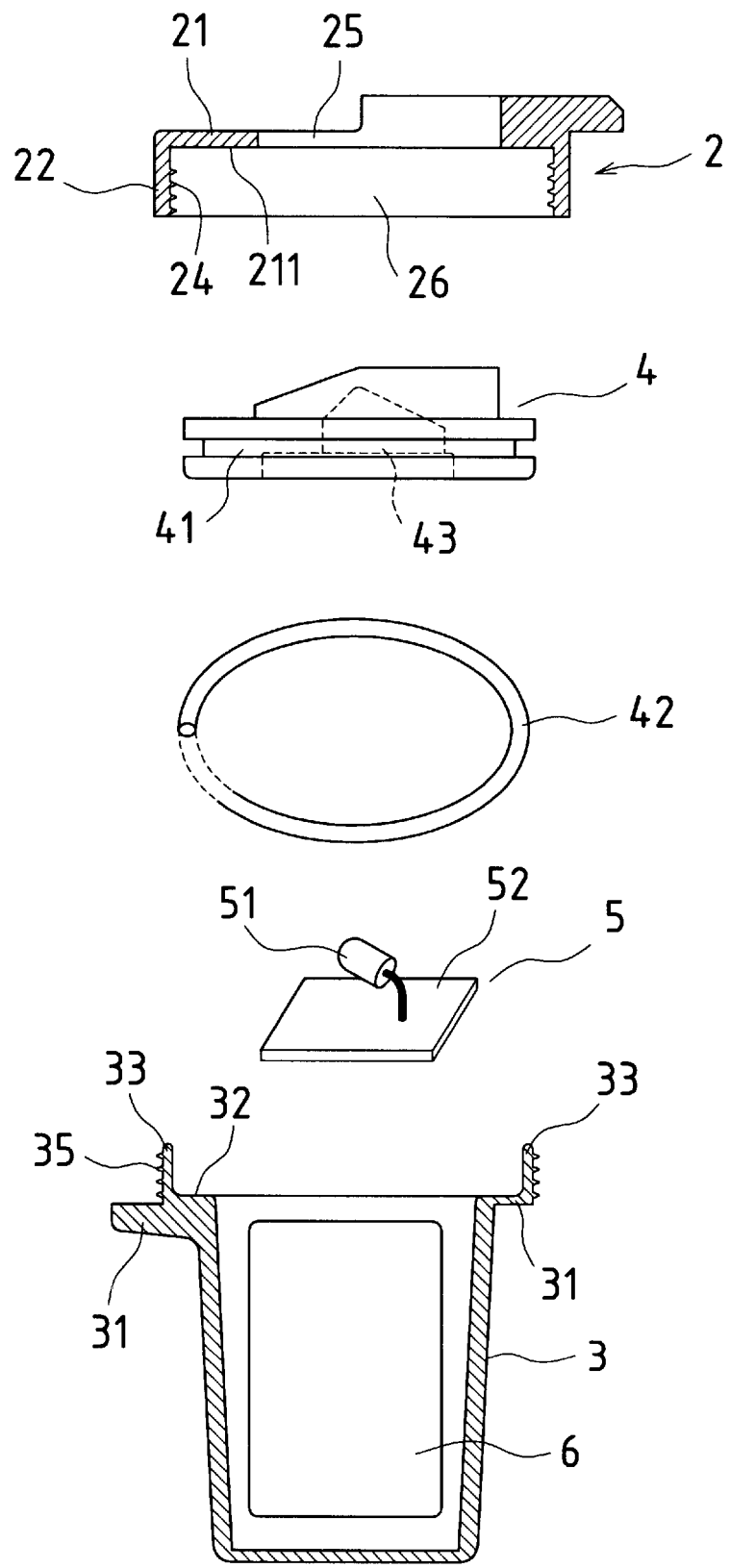
FIG. 3 is an exploded view of the first embodiment.

FIG. 1 is a front view showing the first embodiment of an embeddable self-luminous road stud according to the road marking device of the present invention. FIG. 2 is a sectional view of the first embodiment. FIG. 3 is an exploded view of the first embodiment.

A road stud 1 comprises a tubular, bottomed casing 3 which has an open top end, and a cover 2 which is constituted with a cover top 21 to be mounted over an opening of the casing 3 and a bent wall 22 perpendicularly turned from the cover top 21. The cover 2 also includes a window 25 formed in the cover top 21 and a cavity 26 surrounded by the cover top 21 and the bent wall 22.

The casing 3 has an edge 31 which projects outwardly and horizontally from a top end periphery of the casing 3 and a vertical wall 33 which rises vertically from a certain portion of the edge 31 as formed along the whole circumference of the edge 31. In the cover 2, the bent wall 22 which hangs perpendicularly from the cover top 21 is designed to attach tightly to an external circumference of the vertical wall 33. In the external circumferential surface of the vertical wall 33 and the internal circumferential surface of the bent wall 22, there are formed screw grooves 35, 24, respectively. When these screw grooves are engaged together, the cover 2 is closely and fixedly attached to the casing 3.

The cover 2 and the casing 3 are made of metals such as iron and aluminum.

The casing 3 houses a condenser 6. The casing 3 is also equipped with a luminous unit 5 composed of an illuminant 51 which emits light by receiving a power supplied from the condenser 6 and a circuit board 52 which mounts a circuit for driving the illuminant 51, and further equipped with a transparent element 4 for transmitting and outwardly radiating the light emitted from the illuminant 51.

The condenser 6 is loaded with a lithium or like battery, a lead acid battery or a charger such as an electric double layer condenser. In this embodiment, if the power source is a lithium or similar battery, the road stud requires no other power supply unit. On the other hand, in the case of a lead acid battery or a charger like an electric double layer condenser, a commercial power source or a common solar battery should be combined as a charging power source. To utilize a solar battery, it is disposed below the transparent element 4 so as to take the sunlight transmitted through the transparent element 4, whereby the condenser 6 can be charged with the electric power of the solar battery. Nevertheless, the location of the solar battery should not be limited, and, for example, the solar battery may be separated from the road stud.

As for the luminous unit 5, the illuminant 51 is suitably selected from a light-emitting diode (LED), a halogen lamp, a metal halide lamp, a cathode ray tube, electroluminescence, a xenon lamp, and so on. The illuminant 51 is positioned in a hollow 43 formed in the transparent element 4. The circuit board 52 mounts a circuit for driving the illuminant 51.

The transparent element 4 is made of a light-transmittable material, including polycarbonates, acrylic resins, hard polyvinyl chloride and other synthetic resins, or glass. The transparent element 4 contains the above-mentioned hollow 43. Along its external circumferential wall, there extends a recess 41 to be fitted with a packing material 42 which constitutes a waterproof mechanism. Because the packing material 42 is inserted into the recess 41 and pressed against the vertical wall 33 of the casing 3, this structure blocks the entry of water into the road stud 1. In this embodiment, the recess 41 facilitates and secures the positioning of the packing material 42. Nevertheless, without forming the recess 41, the packing material 42 may be inserted between the external circumferential wall of the transparent element 4 and the vertical wall 33 of the casing 3, with the packing material 42 pressing on the vertical wall 33 of the casing 3. Alternatively, in addition to the recess 41, a corresponding recess may be provided in the vertical wall 33 of the casing 3, so that the packing material 42 can fit in both recesses.

The transparent element 4 is interposed between the cover 2 and the casing 3. While its periphery is securely held by a flat wall 211 of the cover top 21 and the edge 31 and vertical wall 33 of the casing 3, a part of the transparent element 4 protrudes outwardly from the window 25 in the cover 2.

According to the above structure of the present embodiment, referring to FIG. 1, the embeddable road stud 1 is mostly buried into the ground, whereas the protrusion of the transparent element 4 and a part of the cover 2 project above the ground level. The height of such projecting portions is usually about 1.5 to 10 mm, preferably 1.5 to 7 mm and more preferably 1.5 to 5 mm. However, the height is freely adjustable without particular limitations.

FIG. 4 to FIG. 8 illustrate modified embodiments, in which the cover 2 is mounted on the casing 3 in different manners. Each of these embodiments is characterized in its individual mounting structure.

Figure 4:
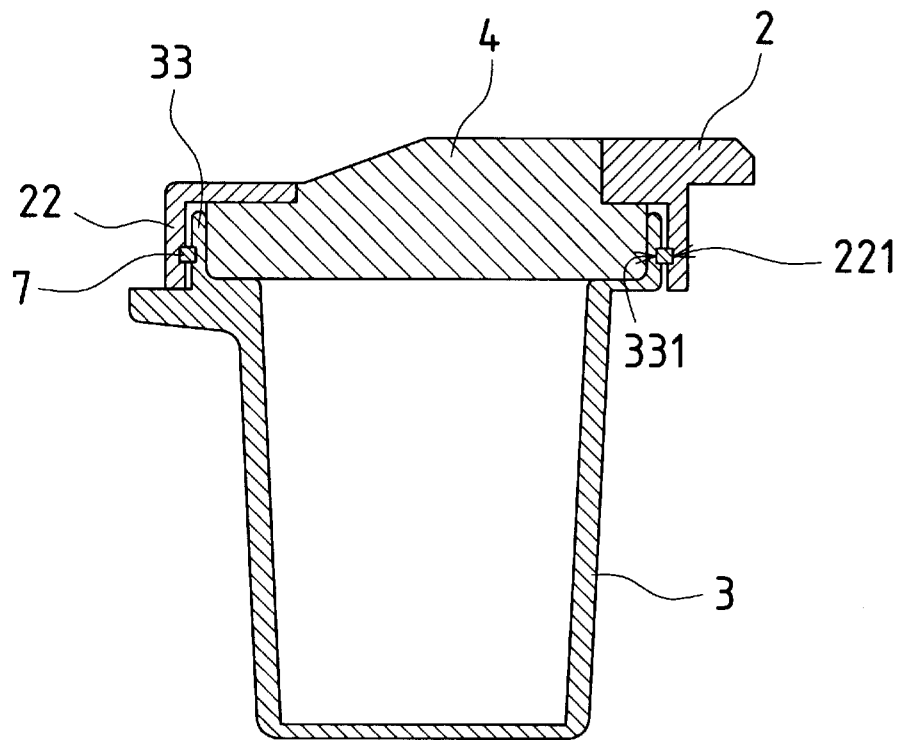
FIG. 4 describes the second embodiment of an embeddable self-luminous road stud according to the road marking device of the present invention.

In the second embodiment shown in FIG. 4, a recess 221 (331) is formed in at least either of the internal circumferential surface of the bent wall 22 of the cover 2 or the external circumferential surface of the vertical wall 33 of the casing 3. The cover 2 is fixed on the casing 3, with a packing material 7 being fitted into the recess 221 (331).

Figure 5:
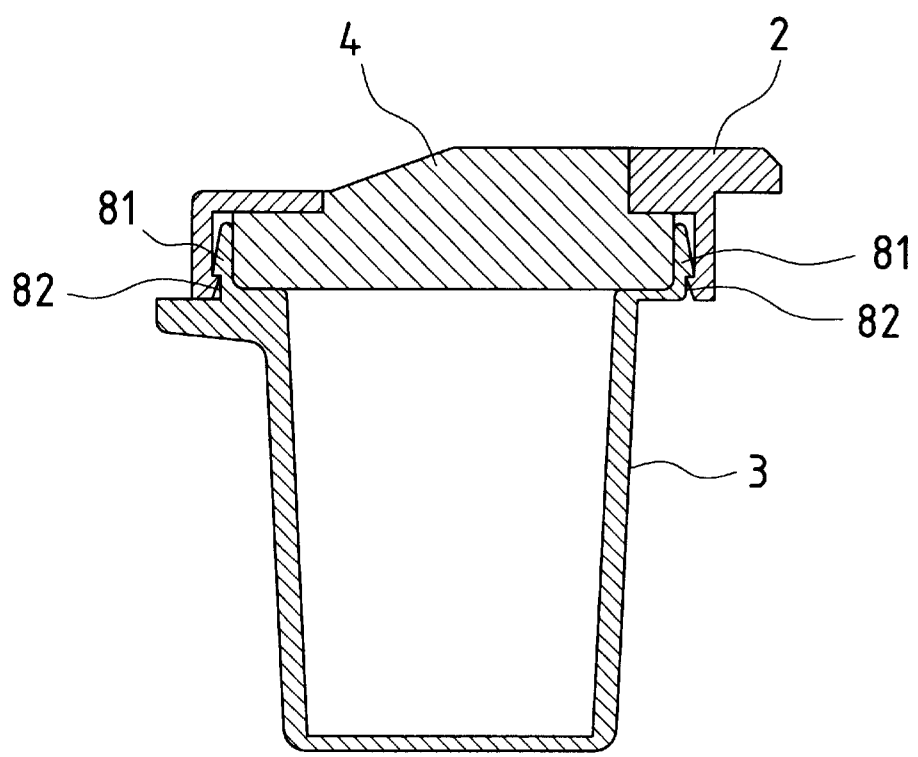
FIG. 5 describes the third embodiment of an embeddable self-luminous road stud according to the road marking device of the present invention.

In the third embodiment shown in FIG. 5, a ridge 81 extends along the external circumferential surface of the vertical wall 33 of the casing 3, and a ridge 82 is formed, in an engageable relation with the ridge 81, along the internal circumferential surface of the bent wall 22 of the cover 2. The cover 2 is fixed on the casing 3, with the ridges 81, 82 being engaged together.

Figure 6:
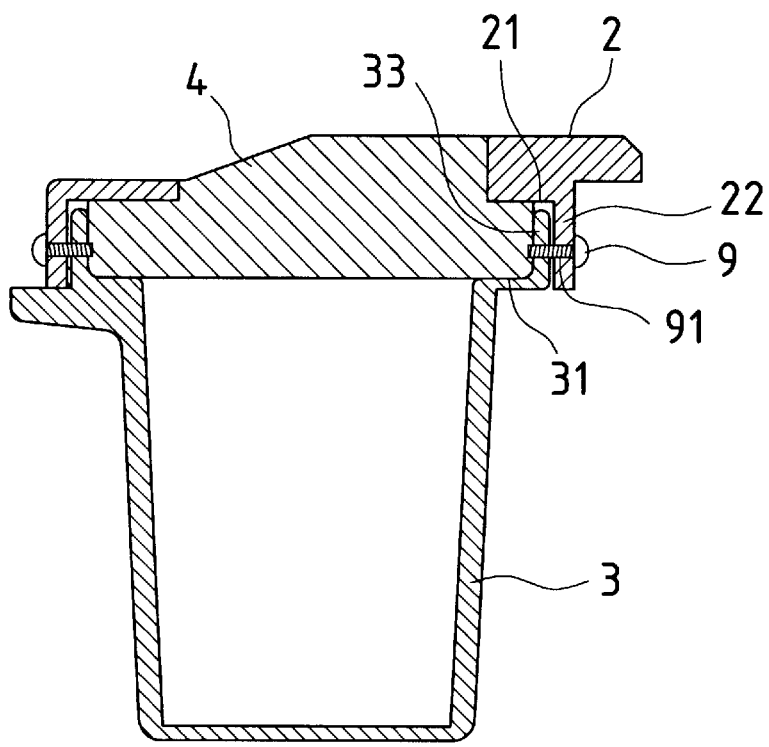
FIG. 6 describes the fourth embodiment of an embeddable self-luminous road stud according to the road marking device of the present invention.

In the fourth embodiment shown in FIG. 6, bolt holes 91 are provided in the vertical wall 33 and the bent wall 22, respectively. These bolt holes 91 are located to communicate with one another, when the external circumferential surface of the vertical wall 33 of the casing 3 is closely attached to the internal circumferential surface of the bent wall 22. The cover 2 is secured in close contact with the casing 3, with a bolt 9 screwed into the bolt holes 91.

Figure 7:
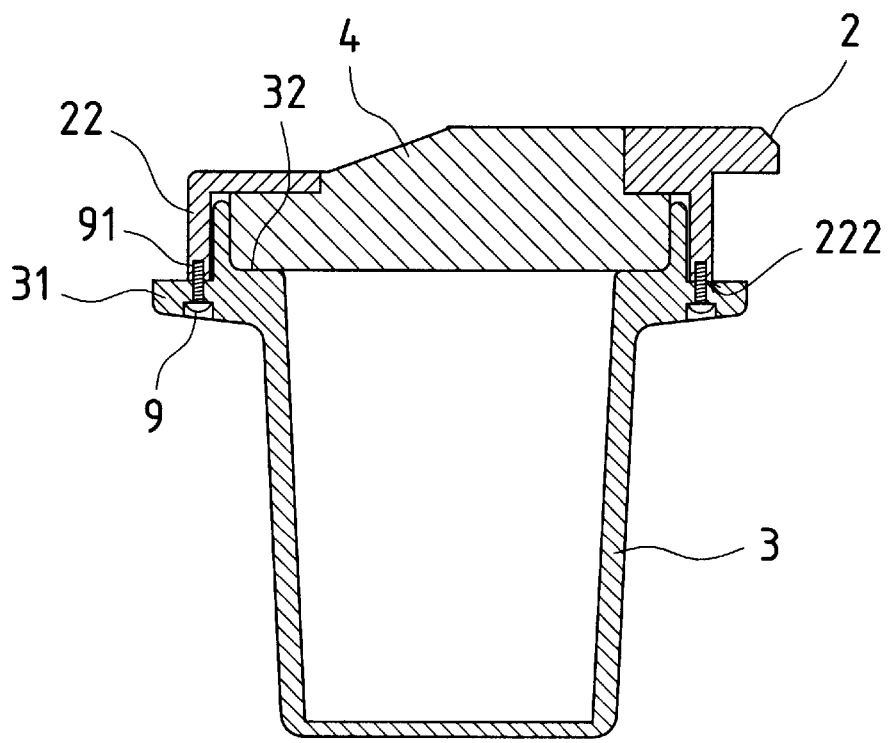
FIG. 7 describes the fifth embodiment of an embeddable self-luminous road stud according to the road marking device of the present invention.

In the fifth embodiment shown in FIG. 7, bolt holes 91 are provided in the edge 31 and a bottom end surface 222 of the bent wall 22, respectively. These bolt holes 91 are located to communicate with one another, when the top surface of the edge 31 is closely attached to the bottom end surface 222 of the bent wall 22. The cover 2 is secured in close contact with the casing 3, with a bolt 9 screwed into the bolt holes 91.

Figure 8:
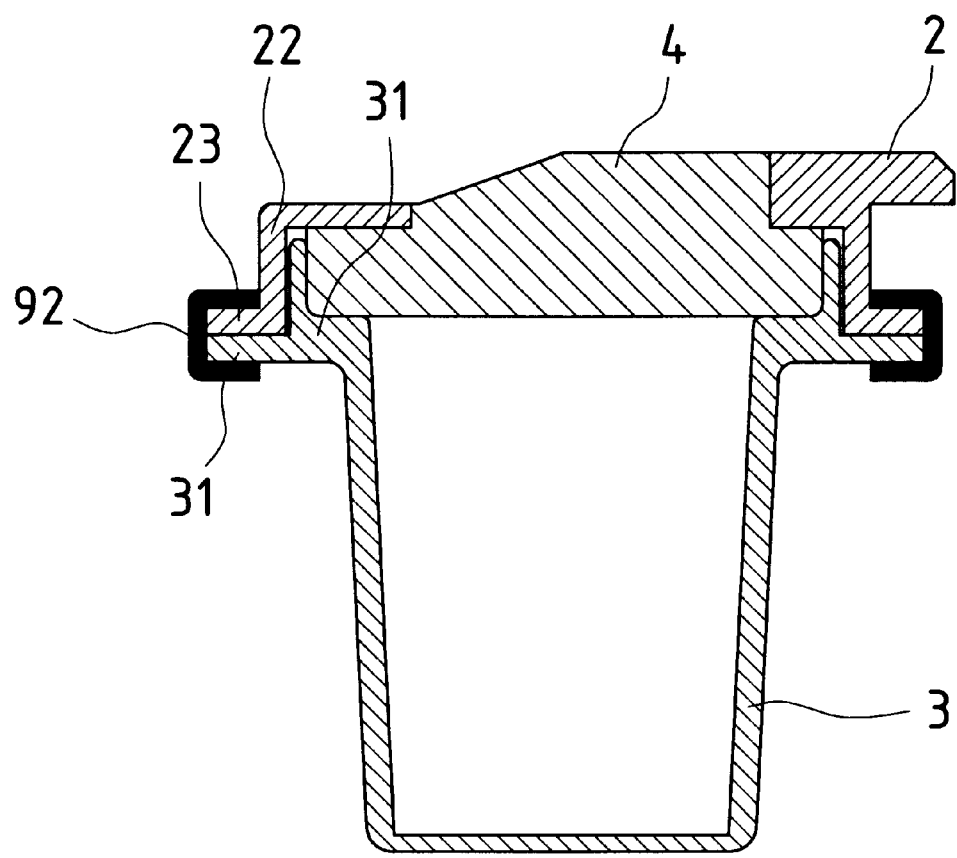
FIG. 8 describes the sixth embodiment of an embeddable self-luminous road stud according to the road marking device of the present invention.

In the sixth embodiment shown in FIG. 8, the cover 2 is equipped with a flange 23 which projects outwardly and horizontally from the bottom end of the bent wall 22. The flange 23 and the edge 31 are tightly clamped together by a spring steel 92. The cover 2 is secured in close contact with the casing 3 by the spring steel 92.

Self-luminous Marking System

As mentioned earlier, the luminous unit 5 and the condenser 6 constitute a mechanism for illuminating the illuminant 51 which establishes the display portion in the road marking device. This mechanism, namely, the self-luminous marking system, is described in greater detail.

Figure 9:
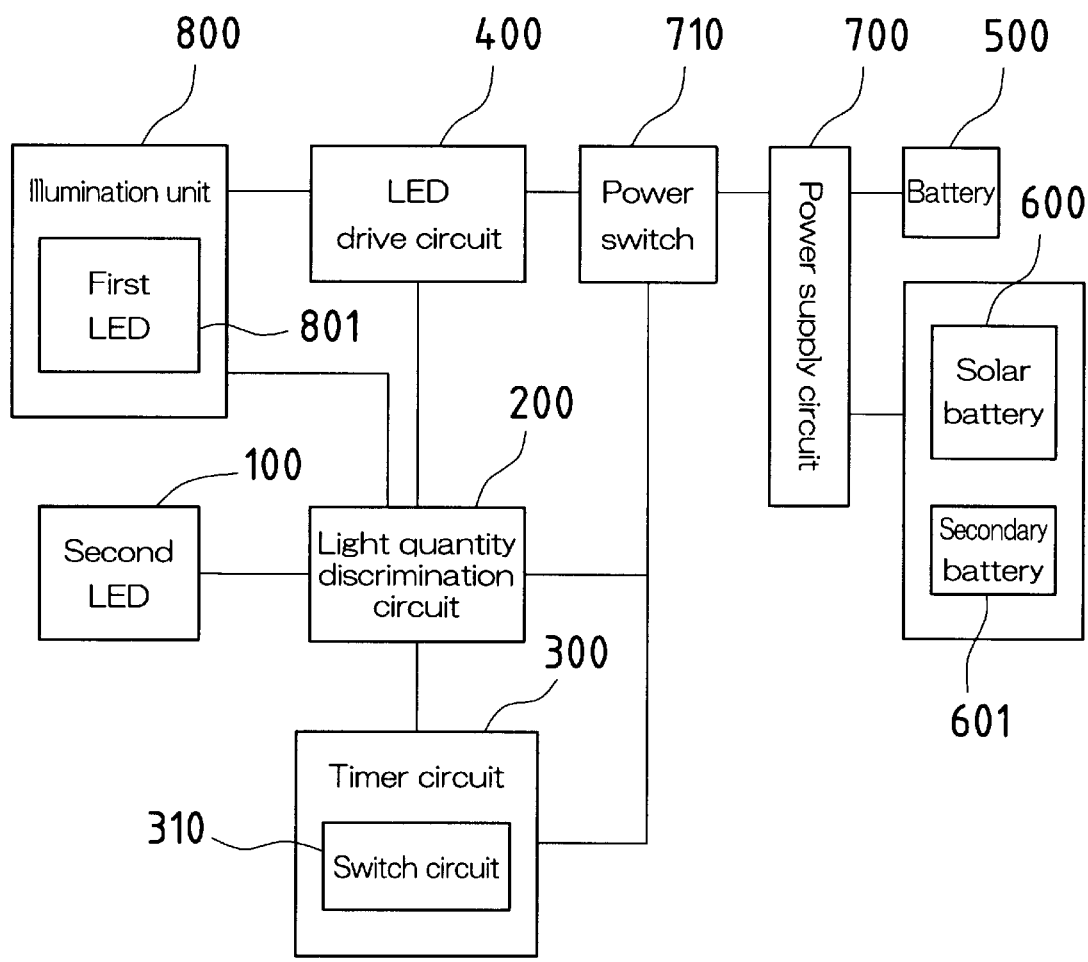
FIG. 9 is a block diagram which represents an embodiment of the self-luminous marking system to be utilized in the road marking device of the present invention.

FIG. 9 is a block diagram which represents the structure of the self-luminous marking system according to this embodiment. FIG. 10 indicates its operations.

The self-luminous marking system comprises an illumination unit 800 including a first light-emitting diode (LED) 801, and a second LED 100. The first LED 801 is allowed to emit light when the quantity of light in the road environment is below a predetermined level. The second LED 100 is utilized with no application of voltage, so as to generate an electromotive force in response to the visible incident light. Formerly, the second LED 100 is lighted up by applying a forward voltage. On the contrary, the present embodiment applies no voltage to the second LED 100, considering the fact that an LED is a crystal having an p-n junction. In other words, this arrangement makes use of the principle that, when a light is incident on the second LED 100, a free electric charge is generated and transformed into an electric energy, thereby producing an electromotive force.

In view of this principle, an electromotive force is produced by the second LED 100, when the quantity of incident light is equal to or greater than a predetermined level. The condition "the quantity of light equal to or greater than a predetermined level" is to be satisfied when the illuminance of a light is equal to or greater than a set value and irradiation of such light continues for a given time or longer. For example, the set illuminance value is chosen in the range from 30 to 300 lux and the given irradiation time is determined in the range from tens of seconds to 10 minutes, depending on the road environment.

A mechanism for controlling ON/OFF of the first LED 801 comprises the following elements. A light quantity discrimination circuit 200 detects the electromotive force generated by the second LED 100 and discriminates the quantity of light in the road environment. A timer circuit 300 includes a switch circuit 310 which turns on and turns off emission of light by the first LED 801, based on the result determined by the light quantity discrimination circuit 200. And, an LED drive circuit 400 activates the first LED 801, provided that the switch circuit 310 is in an unlocked state. The switch circuit 310 remains locked, as long as the second LED 100 generates an electromotive force which is detectable by the light quantity discrimination circuit 200. On the other hand, the switch circuit 310 is unlocked when no electromotive force is detected.

As the power source, there is provided a battery 500 or a solar battery 600 equipped with a secondary battery 601. The LED drive circuit 400 supplies the electric power of the battery 500 or the secondary battery 601, via a power supply circuit 700, to the first LED 801.

The self-luminous marking system of the above structure operates in the manner described below.

When the second LED 100 receives an incident light in a quantity equal to or exceeding the predetermined level, the second LED 100 generates an electromotive force. In this case, judging from the electromotive force generated, the light quantity discrimination circuit 200 recognizes the road environment as "DAY". Based on the discrimination result as "DAY", the switch circuit 310 within the timer circuit 300 is locked. Eventually, the illumination unit 800 is switched off, suspending its illumination function.

On the other hand, when the quantity of light incident on the second LED 100 falls below the predetermined level, an electromotive force is hardly generated. Then, judging from the electromotive force generated, the light quantity discrimination circuit 200 recognizes the road environment as "NIGHT". Based on the discrimination result as "NIGHT", the switch circuit 310 is unlocked to turn on a power switch 710. In turn, the LED drive circuit 400 is activated by an electric power supplied, via the power supply circuit 700, from the battery 500 or the secondary battery 601 which is charged by the solar battery 600 under sunlight irradiation. At the same time, the illumination unit 800 receives the electric power and lights up the first LED 801.

Incidentally, in the foregoing description, the terms "DAY" and "NIGHT" should not be understood in the sense of the normal cycle of a day. Rather, in connection with the quantity of light in the road environment, "DAY" used herein should indicate the condition where the quantity of light is equal to or greater than the predetermined level, and "NIGHT" should be construed as the condition where the quantity of light fails to reach the predetermined level.

The light quantity discrimination circuit 200 supplies a brightness adjusting signal to the diode drive circuit 400, based on the degree of the electromotive force. The brightness adjusting signal controls the illumination mode of the first LED 801 (e.g. lighting and flashing) and adjusts its brightness. In response to the brightness adjusting signal, the diode drive circuit 400 controls the first LED 801 such that a light can be emitted with an appropriate brightness and in a proper illumination mode in view of the road environment.

In the self-luminous marking system, the above-mentioned operations take place only in actual service, that is, after the system is constructed. The system, after being manufactured, goes through the stages of storage, shipment, construction on site, and normal operations. FIG. 10 refers to each of these stages and explains a series of main operations performed by this system.

During storage, the system is kept in a container box. The timer circuit 300 is the only element in operation, whereas the power supply circuit 700 and the LED drive circuit 400 remain inactive. Therefore, the first LED 801 does not emit light at this stage.

During construction, it is supposed that a light whose illuminance is equal to or greater than a set value is continuously irradiated for a given time or longer. By way of example, the illuminance value is set in the range from 30 to 300 lux and the irradiation time is set in the range from tens of seconds to 10 minutes. In this case, the light quantity discrimination circuit 200 operates to activate the timer circuit 300, which is turned into the "ON" state. Once the light quantity discrimination circuit 200 is activated, the timer circuit 300 itself is disconnected from the subsequent operations.

Afterwards, the system commences the normal post-construction operations. Being the same as above, these operations are not repeated here. The day/night operation cycle continues until the battery capacity runs out.

Figure 11:
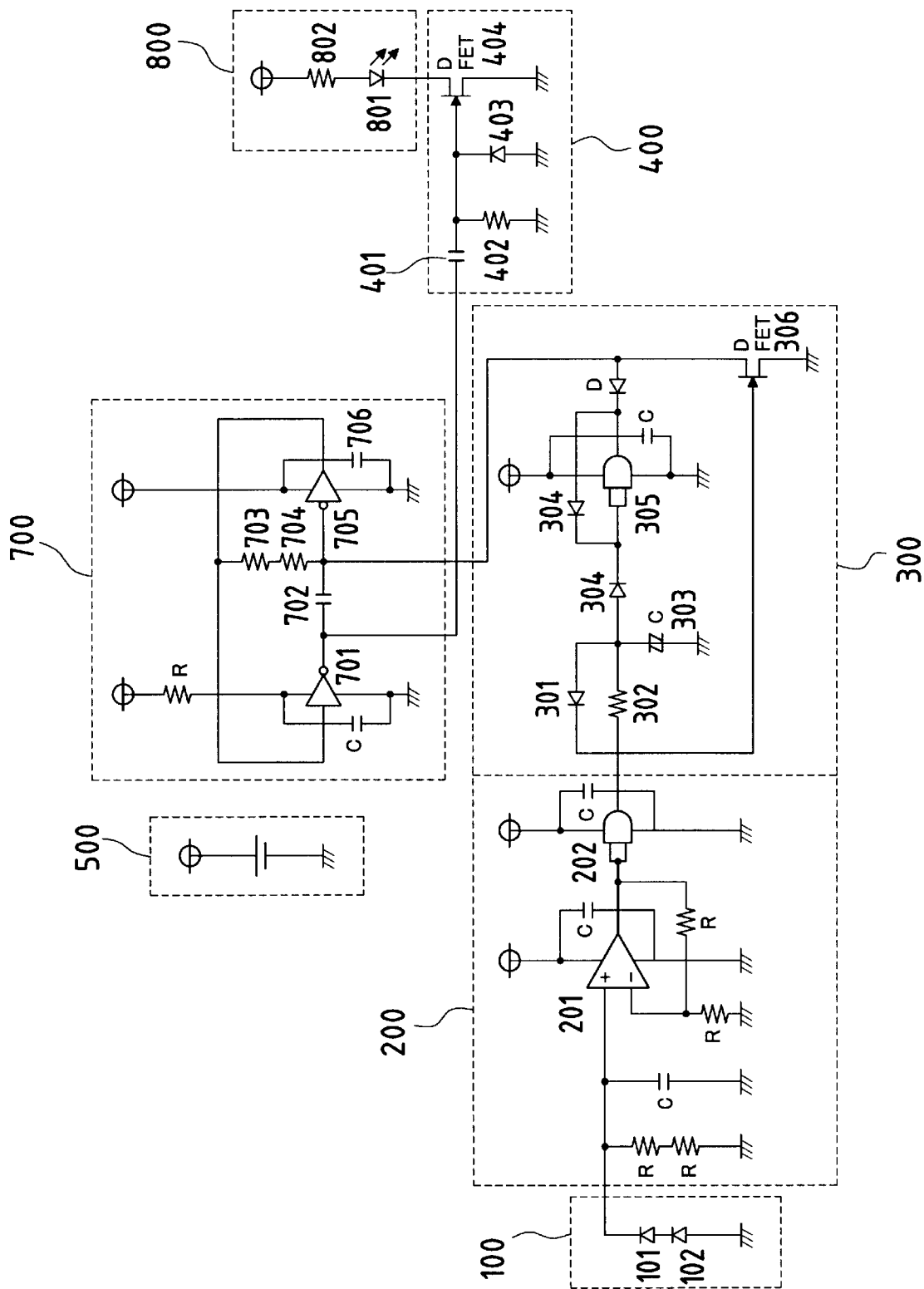
FIG. 11 is a circuit diagram for the embodiment of the self-luminous marking system of the present invention.
Figure 12:
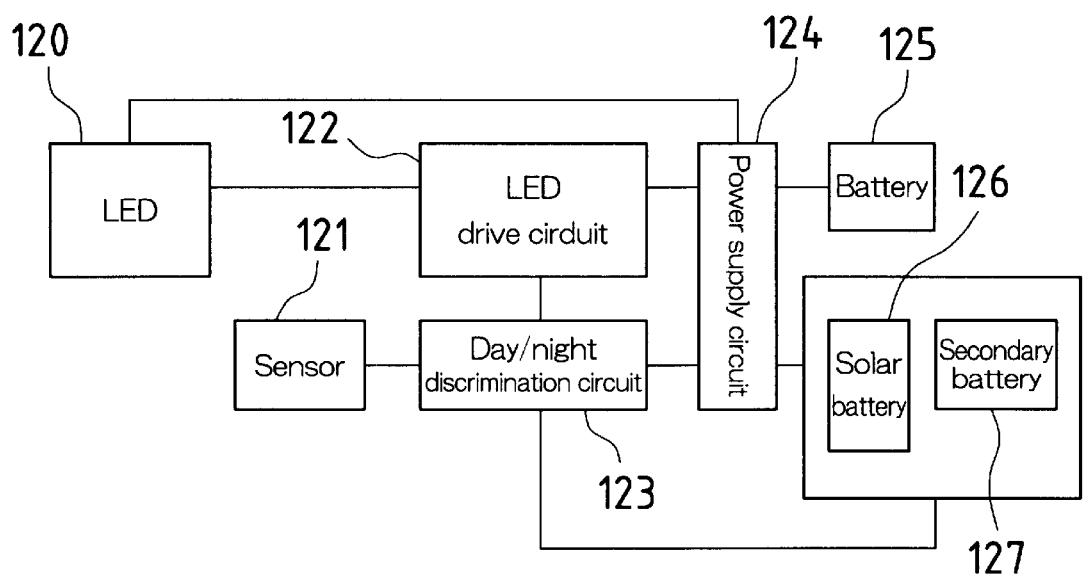
FIG. 12 is a block diagram which represents a prior art technology.

FIG. 11 is a circuit diagram which represents the embodiment of the self-luminous marking system according to the present invention. The detailed circuit diagram corresponds to the blocks shown in FIG. 9. Referring to this circuit diagram, the specific description is given below. It should be borne in mind that the following example is based on the general road environment which involves exposure to sunlight.

The second LED 100 comprises two serially-connected LEDs 101, 102. They generate an electromotive force when the quantity of sunlight incident on these LEDs 101, 102 reaches or exceeds a certain level. The detected voltage is amplified by an operational amplifier 201, the output of which is shaped by an AND circuit 202 to regulate the voltage of the second LED 100. In the meantime, the road environment is discriminated between "DAY" and "NIGHT".

When the light quantity discrimination circuit 200 judges "DAY", the electromotive force is charged in a condenser 303. The electromotive force from the second LED 100 is managed by the charging capacity of the condenser 303. To be specific, when the capacity exceeds a certain amount, a diode 304 locks the switch of the second LED 100. In the locked state, neither the power supply circuit 700 nor the LED drive circuit 400 operates, and the illumination unit 800 does not emit light. Optionally, an indication lamp (not shown) can be connected, whereby the locked condition can be noticed without fail at the blink of the indication lamp. When the condenser 303 is filled over a prescribed capacity, a quick discharge diode 301 carries out a discharge process, the discharge time being dependent on the time constant resistor 302 for an LED switch timer.

During the evening and the night, when no sunlight is incident on the LEDs 101, 102, the electromotive force is not generated. Because the operational amplifier 201 in the light quantity discrimination circuit 200 does not amplify the voltage, the AND circuit 202 regards this situation as "NIGHT". With recognition of "NIGHT", the diode 304 releases the lock of the second LED 100, so that an AND circuit 305 activates a sunset-mode FET 306 and turns on the power supply circuit 700. When the power supply circuit 700 receives the power from the battery 500, an IC circuit 701 produces an arithmetic operation to determine the basic cycle, based on the value of a time constant condenser 702 for basic frequency generation and the values of resistors 703, 704. A signal whose basic cycle is decided is carried to an IC circuit 705, where the condenser 706 acts to cut the noise and stabilizes the basic cycle of the signal. The stable signal is then transmitted to the LED drive circuit 400. The LED drive circuit 400 includes a condenser 401, a time constant resistor 402 for LED lighting time determination which determines the lighting time of the LED, a diode 403 for the removal of a reverse voltage, and an FET 404 for flashing the LED. The power from the battery 500 is controlled by the LED drive circuit 400 and delivered to the illumination unit 800.

The illumination unit 800 is made up of the first LED 801 and a resistor 802 for restricting the LED current. The brightness and the illumination mode (lighting or flashing) of the first LED 801 is specified by the control signal transmitted from the LED drive circuit 400.

The self-luminous marking system may include some independent additional functions. As such, the second LED 100 can serve as a sunset sensor. The sunset sensor detects sunlight as the general detection object. If a detected illuminance is below the illuminance value which is set, for example, in the range from 30 to 300 lux in view of the road environment, the sunset sensor senses "NIGHT" and starts the illumination operation of the first LED, or changes over or adjusts the brightness of the first LED. In contrast, when a detected illuminance is equal to or greater than the illuminance value which is set, for example, in the range from 30 to 300 lux in consideration of the road environment, the sunset sensor senses "DAY" and stops the illumination operation of the first LED, or changes the light emission of the first LED.

As another function, the power switch can be automatically operated by a mechanism constituted with the second LED 100, the light quantity discrimination circuit 200, the timer circuit 300, etc.

Generally speaking, with regard to self-luminous road marking products (particularly, road studs) which use a lead acid battery or the like, efforts are made to minimize the battery dissipation during their long storage period. In known technologies for installment of the road studs, the circuit part and the battery has been connected on site using a connector, in which state the road stud is capped with the cover and buried. Nevertheless, there are some troubles where the connector is left unconnected or where the packing fails to provide good waterproofing. Such incidents are heavily dependent on a number of working conditions such as worksite environment, weather and operator. Therefore, the product quality is not uniform when the construction is finished. In contrast, the system of the present embodiment can deal with such problems. Specifically, in response to an illuminance detected by an LED, the present system can operate the power switch automatically. As a result, the product can be buried directly, without using a connector or opening the cover throughout the construction.

The self-luminous marking system detects the quantity of light in the road environment by a simple structure using an LED, avoiding conventional disadvantages concerning the use of the illuminance sensor or the solar battery output. The system maintains the accuracy of the device, and, at the same time, the size and cost of the device can be reduced easily.

As has been described, the self-luminous marking system of this embodiment is applied to the embeddable self-luminous road stud according to the former embodiments (the first to sixth embodiments). It should be noted, however, the system also offers extended applicability to other various road marking devices.

INDUSTRIAL APPLICABILITY

As mentioned heretofore, the road marking device of the present invention is useful owing to its superior durability as well as the protective function for the transparent element. The self-luminous marking system of the present invention is advantageous in its simple structure, which results in miniaturization and cost reduction. Besides, the self-luminous marking system is applicable to various road marking devices. When utilized in combination with the road marking device of the present invention, synergistic effects are expected.

What is claimed is:

1. A road marking device, which comprises:

a tubular, bottomed casing which has an open top end;

a cover mounted over said opening in the casing and having a window;

a self-luminous marking system composed of an energy storage device housed in the casing, an illuminant which emits light by receiving a power supplied from the energy storage device, and a circuit for driving the illuminant; and a transparent element which transmits and outwardly radiates the light emitted from the illuminant, wherein the transparent element is fixed between the cover and the casing which cooperatively hold a periphery of the transparent element, and wherein a part of the transparent element protrudes outwardly from the window in the cover;

wherein the casing is provided with an edge which outwardly and horizontally projects from a top end periphery of the casing, and a vertical wall which vertically extends from a certain portion of the edge as formed along a whole circumference thereof, and the cover has a bent wall which can be closely attached to an external circumference of the vertical wall, and wherein the casing is capped with the cover, with the external circumference of the vertical wall being closely attached to the bent wall, and the transparent element is fixed in a clamped manner by the edge, an internal circumference of the vertical wall and the cover which cooperatively hold a periphery of the transparent element.

2. A road marking device as claimed in claim 1, wherein the transparent element comprises an external circumferential wall, and wherein a packing material is inserted between the external circumferential wall of the transparent element and the vertical wall, such that the transparent element presses on the vertical wall with interposition of the packing material.

3. A road marking device as claimed in claim 2, wherein the packing material is inserted in a recess formed in the external circumferential wall of the transparent element, such that the transparent element presses on the vertical wall with interposition of the packing material.

4. A road marking device as claimed in claim 1, wherein a screw groove is formed in each of an external circumferential surface of the vertical wall and an internal circumferential surface of the bent wall,
   wherein the cover is fixed in close contact with the casing when the screw grooves are engaged with each other.

5. A road marking device as claimed in claim 1, wherein a recess is formed in at least either of an external circumferential surface of the vertical wall or an internal circumferential surface of the bent wall,
   wherein the cover is fixed on the casing by a packing material inserted in the recess.

6. A road marking device as claimed in claim 1, wherein a ridge is formed on each of an external circumferential surface of the vertical wall and an internal circumferential surface of the bent wall, with each ridge being engageable with the other,
   wherein the cover is fixed on the casing when the ridges are engaged together.

7. A road marking device as in any of claims 1 to 3, wherein each of the vertical wall and the bent wall has a bolt hole, with the bolt holes communicating with one another when an external circumferential surface of the vertical wall is closely attached to an internal circumferential surface of the bent wall,
   wherein the cover is fixed in close contact with the casing by a bolt screwed into these bolt holes.

8. A road marking device as in any of claims 1 to 3, wherein each of the edge and the bent wall has a bolt hole, with the bolt holes communicating with one another when a top surface of the edge is closely attached to a bottom end surface of the bent wall,
   wherein the cover is fixed in close contact with the casing by a bolt screwed into these bolt holes.

9. A road marking device as claimed in claim 1, wherein the cover is equipped with a flange which outwardly and horizontally projects from a bottom end of the bent wall, and a spring steel is provided for tightly clamping the flange and the edge,
   wherein the cover is fixed in close contact with the casing by the spring steel.

10. A self-luminous marking system which comprises:
   a first LED which emits light when a quantity of light in a road environment is less than a predetermined level;
   a battery for supplying a power to the first LED;
   a drive circuit for controlling a drive of the first LED;
   a second LED utilized without application of voltage so as to generate an electromotive force in response to an incident light;
   a light quantity discrimination circuit which determines, based on the electromotive force generated by the second LED, whether the quantity of light in the road environment is less than the predetermined level; and
   a switch circuit which controls an operation of the drive circuit, based on a result determined by the light quantity discrimination circuit.

11. A self-luminous marking system which comprises:
   a first LED which emits light when a quantity of light in a road environment is less than a predetermined level;
   a solar battery and a condenser element for supplying a power to the first LED;
   a drive circuit for controlling a drive of the first LED;
   a second LED utilized without application of voltage so as to generate an electromotive force in response to an incident light;
   a light quantity discrimination circuit which determines, based on the electromotive force generated by the second LED, whether the quantity of light in the road environment is less than the predetermined level; and
   a switch circuit which controls an operation of the drive circuit, based on a result determined by the light quantity discrimination circuit.

12. A self-luminous marking system as claimed in claim 10 or 11, wherein the light quantity discrimination circuit starts to operate, when the second LED continuously generates an electromotive force for a given time in response to the incident light.

13. A road marking device which comprises:
   a tubular, bottomed casing which has an open top end;
   a cover mounted over an opening in the casing and having a window;
   a self-luminous marking system composed of a power source housed in the casing, an illuminant which emits light by receiving a power supplied from the power source, and a circuit for driving the illuminant; and
   a transparent element which transmits and outwardly radiates the light emitted from the illuminant,
   wherein the transparent element is fixed between the cover and the casing which cooperatively hold a periphery of the transparent element, with a part of the transparent element protruding outwardly from the window in the cover,
   wherein the self-luminous marking system comprises:
      a battery as the power source;
      a first LED which emits light by receiving a power supplied from the battery, when a quantity of light in a road environment is less than a predetermined level;
      a drive circuit for controlling a drive of the first LED;
      a second LED utilized without application of voltage so as to generate an electromotive force in response to an incident light;
      a light quantity discrimination circuit which determines, based on the electromotive force generated by the second LED, whether the quantity of light in the road environment is less than the predetermined level; and
      a switch circuit which controls an operation of the drive circuit, based on a result determined by the light quantity discrimination circuit.

14. A road marking device as claimed in claim 13, wherein the power source comprises a solar battery and a condenser element.

15. A road marking device as claimed in claim 13 or 14, wherein the casing is provided with an edge which outwardly and horizontally projects from a top end periphery of the casing, and a vertical wall which vertically extends from a certain portion of the edge as formed along a whole circumference thereof, and the cover has a bent wall which can be closely attached to an external circumference of the vertical wall, and
   wherein the casing is capped with the cover, with the external circumference of the vertical wall being closely attached to the bent wall, and the transparent element is fixed in a clamped manner by the edge, an internal circumference of the vertical wall and the cover which cooperatively hold a periphery of the transparent element.

* * * * *